No. 645,452.  
F. H. BOLTE.  
MOLD FOR VULCANIZING TIRES.  
(Application filed Oct. 29, 1898.)

Patented Mar. 13, 1900.

(No Model.)

WITNESSES  
J H Blunch  
Charles J Wolfe

INVENTOR  
Frank H. Bolte  
By L. M. Thurlow.  
ATTY.

UNITED STATES PATENT OFFICE.

FRANK H. BOLTE, OF PEORIA, ILLINOIS, ASSIGNOR TO THE PEORIA RUBBER AND MANUFACTURING COMPANY, OF SAME PLACE.

MOLD FOR VULCANIZING TIRES.

SPECIFICATION forming part of Letters Patent No. 645,452, dated March 13, 1900.

Application filed October 29, 1898. Serial No. 694,868. (No model.)

*To all whom it may concern:*

Be it known that I, FRANK H. BOLTE, a citizen of the United States, residing at Peoria, in the county of Peoria and State of Illinois, have invented certain new and useful Improvements in Molds for Vulcanizing Tires; and I do hereby declare that the following is a full, clear, and exact description of the invention, which will enable others skilled in the art to which it appertains to make and use the same.

This invention relates to improved molds for vulcanizing rubber tires.

One object of the invention is to form the molding portion proper of one piece of metal, thereby providing a substitute for the sectional molds heretofore employed.

Furthermore, the object is to form a mold in which a tire may be placed and vulcanized without leaving marks or ridges upon its surface.

As a further object I provide a simplified form of mold for vulcanizing tires in helical or coiled form; but while it is old to make tires in this form the mold I use is new.

Figure 1:
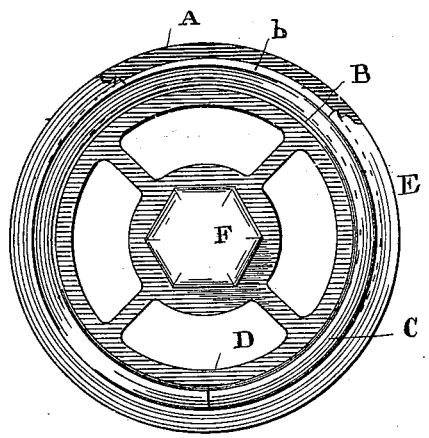
Figure 3:
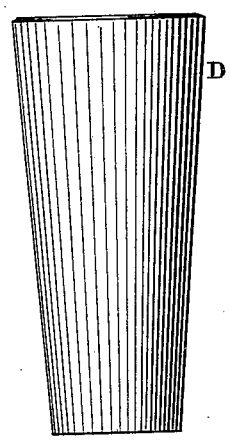
Figure 2:
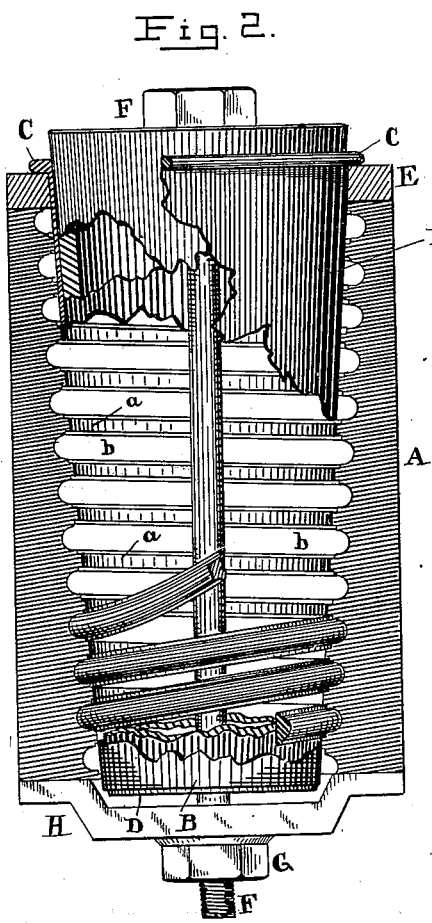
Figure 4:
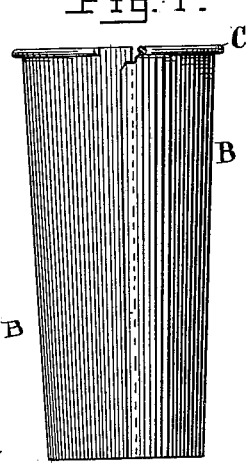

In the accompanying drawings, Figure 1 is a plan view of the mold. Fig. 2 is a part-sectional elevation of the same. Fig. 3 is an elevation of a plug or mandrel. Fig. 4 is an elevation of a longitudinally-split tube or shell.

A is the container or mold, consisting of a block of metal provided with a tapering bore $a$, as shown in Fig. 2. This taper is formed either by boring out in the lathe or coring it out when casting the block, the latter method being preferable by reason of its simplicity and cheapness. The mold is provided with a spiral groove or channel $b$, which may extend from one end to the other or only a portion of the distance, if desired, but having a cross-section corresponding to the particular form of tire wanted. A longitudinally-split shell B, with a projecting lip C at its top edge, is next provided and slips into the said tapering bore and is followed by a plug or mandrel D of the same taper. The plug may be solid or hollowed out to admit heat more freely for the vulcanizing process. A ring E is placed upon the mold and supports the lip C of the shell B. This is not absolutely essential, but desirable, because the groove $b$, if it extends from end to end, cuts away a portion of the top edge of the mold, as shown by dotted lines in Fig. 1. A bolt F passes centrally through the plug or mandrel and is provided with a nut G, bearing against a yoke H on the bottom of the mold.

This apparatus is especially adapted to the making of solid-rubber tires of that class which are molded in sectional lengths or in one continuous length, but of a smaller circumference than that of the wheel upon which they are to be placed and in which the section or convolutions are all of substantially the same circumference. However, I wish it understood that I do not confine myself to this particular use of the mold, nor any form of it to accommodate the peculiar helical shape of tire mentioned.

In the drawings I show a mold which is of such size as to admit of making a tire of a sufficient length to completely encircle the wheel. In handling the tire before vulcanizing the crude rubber is first coiled or wound upon a mandrel to get it into convenient shape to insert in the mold. The mandrel is then withdrawn and the hand inserted in its place. The lower end of the coil is grasped and seated in the groove and, continuing, the entire length is pressed into place, after which the shell B is let into the mold and pressed against the rubber. The plug I is then dropped into place within the shell and drawn down tightly by means of the bolt and its nut. This operation forces the rubber into every corner, and its particular form of cross-section is thus imparted to it. The vulcanizing process is then proceeded with. The shell B may be dispensed with and the plug used alone, if desired; but the shell is more convenient and gives, possibly, better results. It is evident that the groove $b$ need not be continuous, but may be formed in various short cuts, or the entire inner surface of the bore may be provided with a series of annular grooves instead of the spiral. In this case the tire will be formed in short lengths only.

I am not aware of any molds that have been used for vulcanizing tires which are of the shape described, nor indeed am I aware that a mold of this kind has been used for any purpose whatsoever, and therefore consider the same entirely new.

The bore in the mold A may be perfectly straight from one end to the other or, more properly speaking, a bore of the same caliber throughout. A split shell, also, for this form will be straight instead of tapering, and any means may be employed for expanding such shell to accomplish the purposes before set forth. Furthermore, a straight plug may be used without employing the shell, such plug being drawn into the mold by the means described or by other equally-efficient method and then expanded, as it could be if made in sectional parts.

In Fig. 2 is shown a portion of a tire as it lies in its position within the groove or channel. The shell B is made to overlap at its edges, so that when expanded to its widest limit by the plug D no gap will be left, it being understood that the metal is made very thin at these edges, so that no perceptible ridge is formed in the rubber. It is obvious that various forms of the groove *b* may be employed and that a number of changes may be effected when making the mold—as, for instance, the latter may be made in sections, as it is not my intention to limit myself to any particular construction, but merely to indicate my main ideas.

Evidently tires could be vulcanized in a straight length in a suitable straight mold by using a plug adapted to be drawn in to obtain pressure, substantially as described for the form illustrated in the drawings.

In practice I may omit the shell and use the plug only, as before stated, and I may use other means than that shown in the drawings and described herein for expanding the shell when such portion is employed.

I am aware of a mold for vulcanizing tires of the character described which is made in sections and when so constructed necessarily leaves ridges on the finished tire, due to the joints between the mold-sections. The mold cannot be used in one piece owing to the peculiar form of mandrel used. The device is expensive, and very careful manipulations are necessary in using the same, while my mold is easily constructed, leaves no objectionable marking on the finished tire, and is easily used.

Having thus fully described my invention, what I claim as new, and desire to secure by Letters Patent, is—

1. For vulcanizing tires, a mold having an internal bore, grooves in the mold within the bore wherein to seat the material to be vulcanized, and an expanding shell therein adapted to force the material into the grooves and there hold it during the vulcanizing process.

2. In a device for forming and vulcanizing tires, a mold having a tapering bore, a spirally-cut groove within the bore wherein to seat the material to be vulcanized, and means within the bore of said mold for compressing the material and holding it during the vulcanizing process substantially as set forth.

3. In a device for forming and vulcanizing tires, a mold, a tapering bore therein, a spirally-cut groove within the bore wherein to seat the material to be vulcanized, a split shell within the bore adapted to compress the material in the groove and a tapering plug adapted to be drawn into the shell to expand the same for the purposes set forth.

4. For vulcanizing tires, a mold consisting of one section having an internal tapering bore, a spiral groove within the bore, the convolutions thereof rising one above another, whereby the convolutions of the tire placed therein for vulcanization are all of the same circumference substantially as described and shown and for the purposes set forth.

5. A mold for forming and vulcanizing tires, comprising a one-piece body having an internal tapering bore and grooves in the latter wherein to seat the tire to be vulcanized and a tapered plug adapted to be drawn into the bore for the purposes set forth.

6. A mold for vulcanizing vehicle-tires consisting of a one-piece body having a tapering bore of smaller diameter than the wheel on which the finished tire is to be placed, a spiral groove within the bore, each successive convolution of such groove being larger than the preceding one, to conform with the constantly-increasing size of the bore, and a plug adapted to be drawn into the mold for the purposes set forth.

7. A mold for vulcanizing tires consisting of the body A having a tapering bore, the grooves *b* therein conforming in size to the said tapering bore, the split shell B having the lip C on its top edge for the purposes set forth, a hollow plug D adapted to enter the said shell to force the latter against the interior of the mold and the tire placed therein, and means for drawing said plug into such shell all for the purposes set forth.

8. A mold for vulcanizing tires consisting of the body A having a tapering bore, the grooves *b* therein conforming in size to the said tapering bore, the split shell B having the lip C on its top edge for the purposes set forth, a hollow plug D adapted to enter said shell to force the latter against the interior of the mold and the tire placed therein, a bolt F passing through the plug, a yoke H at the bottom of the mold and having said bolt passing through it, and the nut G for tightening the bolt for drawing the plug into its seat as set forth.

9. In a tire-mold, the mold A of one piece having an internal bore, grooves cut in the bore adapted to receive the tire-sections for vulcanization, a shell seated in such bore to force the said tire-sections into place in the grooves and a plug adapted to be drawn within the shell for expanding same for the purposes specified.

10. In a tire-mold, the mold A of one piece having a tapering bore, a spirally-arranged groove within the bore adapted to receive a tire for vulcanization, substantially as described, a shell for the bore for forcing the tire into place and a plug adapted to be drawn into the shell for expanding the same substantially as and for the purposes set forth and described.

11. In a mold for vulcanizing tires, a mold of one piece having an internal bore, grooves in the bore of the desired form of cross-section, an expansible shell within the bore, for the purposes set forth, a ring on the top of the mold for sustaining the shell, a plug adapted to enter the shell, a bolt passing longitudinally through the plug, a yoke bearing against the bottom of the mold, through which said bolt also passes, and tightening means on the bolt, having bearing on the yoke, for drawing the plug down to expand the said shell as set forth and for the purposes specified.

In testimony whereof I affix my signature in presence of two witnesses.

FRANK H. BOLTE.

Witnesses:
  A. T. SEIBERLING,
  MONROE SEIBERLING.